United States Patent [19]

Gilmore

[11] 4,194,786
[45] Mar. 25, 1980

[54] SAFETY BELT ANCHORAGE ASSEMBLY

[75] Inventor: William J. Gilmore, Manitou Beach, Mich.

[73] Assignee: Acco Industries Inc., Bridgeport, Conn.

[21] Appl. No.: 855,568

[22] Filed: Nov. 29, 1977

[51] Int. Cl.² .................... A62B 35/00; B60R 21/10
[52] U.S. Cl. .................................... 297/468; 297/482
[58] Field of Search ............... 280/744, 747; 297/385, 297/389, 468

[56] References Cited

U.S. PATENT DOCUMENTS

| | | | |
|---|---|---|---|
| 2,855,028 | 10/1958 | Matthews | 297/385 |
| 2,880,788 | 4/1959 | Phillips et al. | 297/385 |
| 3,258,293 | 6/1966 | Sharp | 297/385 X |
| 3,318,634 | 5/1967 | Nicholas | 297/385 X |
| 3,692,361 | 9/1972 | Ivarsson | 297/385 |
| 3,785,701 | 1/1974 | Gilmore | 297/385 |
| 3,941,419 | 3/1976 | Blom | 280/744 |
| 3,981,535 | 9/1976 | Henderson | 297/389 |

FOREIGN PATENT DOCUMENTS

| | | | |
|---|---|---|---|
| 1274004 | 7/1968 | Fed. Rep. of Germany | 280/744 |
| 2244890 | 4/1973 | Fed. Rep. of Germany | 297/385 |
| 2244419 | 3/1974 | Fed. Rep. of Germany | 297/385 |
| 2656121 | 6/1977 | Fed. Rep. of Germany | 297/385 |

Primary Examiner—James T. McCall
Attorney, Agent, or Firm—Pennie & Edmonds

[57] ABSTRACT

An anchorage assembly for a safety belt which exhibits sufficient flexibility in a lateral direction to permit a passenger to slide thereover and sufficient rigidity in at least one perpendicular direction to permit one-handed coupling of the safety belt and anchorage assembly. The preferred embodiment comprises a composite plastic and cable member of substantially rectangular cross section. A pair of substantially parallel cable lengths extend longitudinally between end reinforcing members, and one or more intermediate reinforcing members extend transversely between the cable lengths to restrain them to a predetermined maximum spacing. Such a structure is highly flexible in the lateral direction perpendicular to the plane of the cables and substantially rigid in the directions within the plane.

4 Claims, 3 Drawing Figures

SAFETY BELT ANCHORAGE ASSEMBLY

BACKGROUND OF THE INVENTION

1. Field of the Invention

This invention relates to a safety belt anchorage assembly and, in particular, to an anchorage assembly which simultaneously exhibits sufficient flexibility in a lateral direction to permit a passenger to slide thereover and sufficient rigidity in at least one perpendicular direction to permit one-handed coupling of the safety belt and anchorage assembly.

2. History of the Art

One type of safety belt assembly for automobiles typically comprises a flexible strap which extends from a floor anchor behind the seat on one side of a passenger and around his waist to an anchorage asseembly on his other side. The strap and anchor assembly are each provided with interlocking coupling devices, such as a conventional tongue and buckle, for securing the strap around the passenger.

A troublesome problem with this type of arrangement is that it requires the use of two hands to buckle. Thus, if a driver forgets to buckle up before he starts driving, he cannot safety remedy that oversight until he stops his car.

One proposed solution to this difficulty is set forth in U.S. Pat. No. 3,258,293 issued to Jonathan Sharp on June 28, 1966. The Sharp patent discloses, in connection with a waist-type belt on a single seat, a rigid connector arm arranged to permit the belt to be fastened with one hand and to prevent the arm from falling out of the side door when not in use.

The rigidity of the Sharp connector, however, presents difficulties in numerous applications where the passenger must move past the connector to enter or leave his seat. Such a connector, for example, cannot be comfortably used in the intermediate portions of a multiple-passenger seat. It would not deflect when a passenger slides or is jostled into contact with it. Accordingly, there is a need for a connector arrangement which simultaneously exhibits flexibility in a lateral direction and stiffness in at least one perpendicular direction.

SUMMARY OF THE INVENTION

In accordance with the invention an anchorage assembly for a safety belt which exhibits sufficient flexibility in a lateral direction to permit a passenger to slide thereover and sufficient rigidity in at least one perpendicular direction to permit one-handed coupling of the safety belt and anchorage assembly. The preferred embodiment comprises a composite plastic and cable member of substantially rectangular cross section. A pair of substantially parallel cable lengths extend longitudinally between end reinforcing members, and one or more intermediate reinforcing members extend transversely between the cable lengths to restrain them to a predetermined maximum spacing. Such a structure is highly flexible in the lateral direction perpendicular to the plane of the cables and substantially rigid in the directions within the plane.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings.

For convenience of reference, the same reference numerals are used to designate the same structural elements throughout the drawings.

DETAILED DESCRIPTION OF THE DRAWINGS

Figure 1:
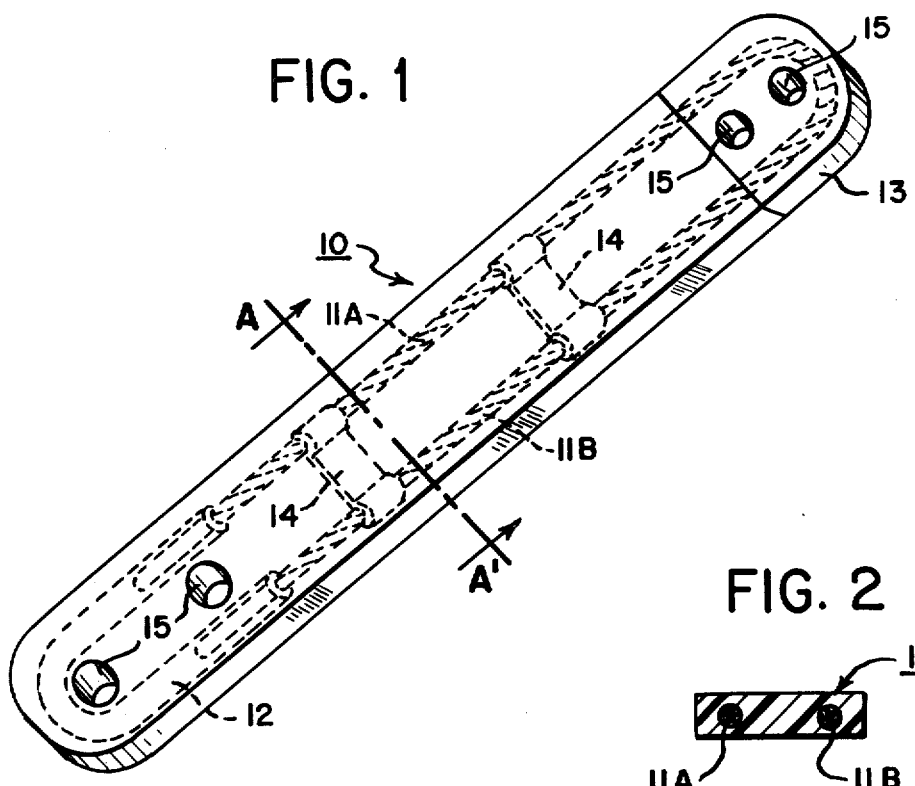
FIG. 1 is a perspective view of a safety belt anchorage assembly in accordance with the invention.
Figure 2:
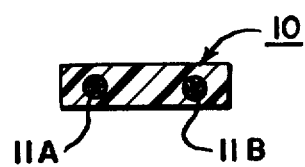
FIG. 2 is a cross section of the anchorage assembly of FIG. 1 along the line A-A'.

Referring to the drawings, FIGS. 1 and 2 are a perspective view and a cross-sectional view, respectively, of a safety belt anchorage assembly in accordance with the invention. In substance, the assembly comprises an elongated composite member 10 of flexible plastic within which are embedded a plurality of substantially parallel metal cable lengths 11A and 11B which longitudinally extend between a pair of reinforcing metal end members 12 and 13. One or more intermediate transverse metal reinforcing members 14 extend transversely between the cable lengths at positions intermediate end members 12 and 13 connect the cables in order to restrain them to a predetermined maximum spacing within member 10. Advantageously, the reinforcing metal end members can include means, such as apertures 15, for facilitating connections.

As shown in FIG. 2, composite member 10 preferably has a rectangular cross section with a relatively long dimension in the plane of the parallel wires and a relatively narrow dimension in the direction perpendicular to such plane.

In an exemplary embodiment, the plastic can be polyvinyl chloride and the cable can be 9/64 inch, $1 \times 19$ steel cable. End reinforcing member 13 can be conveniently molded of die cast zinc about a loop in the cable, and end reinforcing member 12 can be a conventional crimped steel "U" fitting interconnecting the cable ends. Typical dimensions for the composite member 10 are on the order of $8'' \times 1'' \times \frac{1}{4}''$.

The advantages of this assembly include a high degree of flexibility in the direction perpendicular to the plane defined by the parallel cables and substantial rigidity in the directions within the plane. Thus, the assembly has a high degree of stiffness in both the direction between the two cables and in the longitudinal direction between the two ends. In application as a seat belt anchor, the assembly can be oriented so that passenger movement into and out of the seat opposes only the highly flexible orientation of the structure whereas passenger efforts to buckle the seat belt are opposed (and hence aided) by a stiff structure.

Figure 3:
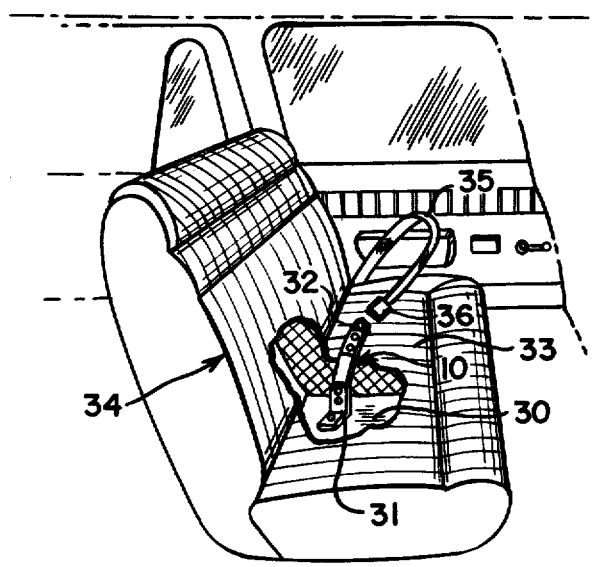
FIG. 3 is a diagrammatic, cut away, perspective view of a portion of an automobile having a safety belt mounted therein with the anchorage assembly of FIG. 1.

FIG. 3 illustrates one exemplary application of this anchorage assembly in an automobile safety belt assembly. Specifically, anchor assembly 10 is shown anchored to the floor 30 of an automobile as by bracket 31 to which it can be bolted at end 12 through apertures 15. The upper end 13 of member 10 can comprise, or be attached to, as by rivets or bolts, a coupling element 32 such as a tongue member.

As illustrated, the anchor assembly is preferably anchored in such orientation that the plane defined by the parallel cables is in line with the front-to-back direction of the car. With this orientation, the member can extend above the bottom supporting surface 33 of seat 34, and will readily deflect in response to forces applied in the side-to-side direction.

The remaining portion of the safety belt assembly can comprise a flexible strap 35, such as nylon webbing, with one end anchored to the floor on the other side of the seat and the other end including a coupling element such as adjustable buckle 36 for coupling to tongue 32.

Although anchor assembly 10 is sufficiently flexible in the side-to-side direction to permit a passenger to readily slide thereover, because of its particular internal structure it is nonetheless sufficiently rigid in the direction from the front-to-back of the automobile that the coupling elements can be readily interconnected with only one hand.

While the invention has been described in connection with a small number of specific embodiments, it is understood that these embodiments are merely illustrative of the many other specific embodiments which also utilize the principles of the invention. For example, it is clear that the invention can be used in conjunction with a variety of alternative coupling elements requiring rigidity for one-handed fastening. Thus, numerous and varied devices can be made by those skilled in the art without departing from the spirit and scope of the present invention.

I claim:

1. In a car belt assembly of the type comprising flexible strap means extending from an anchorage around a person to be restrained, an anchorage assembly attached to a second anchorage, and coupling means for interconnecting said flexible strap and said anchorage assembly, the improvement wherein:

said anchorage assembly comprises an elongated composite member of a plurality of substantially planar and substantially parallel lengths of flexible metal cable substantially embedded in resilient plastic material, said assembly being oriented with the plane defined by said parallel cables in line with the front-to-back direction of the car and exhibiting sufficient flexibility in a direction perpendicular to said plane to permit ready deflection of said assembly in the perpendicular direction by the movement of such person and, at the same time, exhibiting sufficient stiffness in the direction within said plane as to permit one-handed interconnection of said coupling means.

2. A safety belt assembly according to claim 1 wherein said anchorage assembly further comprises one or more intermediate transverse reinforcing members, extending transversely between said parallel lengths of cable, and coupled thereto, for constraining said parallel lengths to a maximum spacing.

3. A safety belt assembly according to claim 1 wherein said anchorage assembly comprises an elongated composite member having a substantially rectangular cross section.

4. A safety belt assembly according to claim 1 wherein said anchorage assembly further comprises, embedded in said composite member, metal reinforcing end members longitudinally coupled to said parallel lengths of cable.

* * * * *